United States Patent [19]

Tortorello et al.

[11] Patent Number: 4,847,314
[45] Date of Patent: Jul. 11, 1989

[54] POLYESTER COATINGS FROM TEREPHTHALATE POLYESTER AND HYDROXY-FUNCTIONAL LINEAR POLYESTER

[75] Inventors: Anthony J. Tortorello; Helene Gong, both of Elmhurst, Ill.

[73] Assignee: DeSoto, Inc., Des Plaines, Ill.

[21] Appl. No.: 192,768

[22] Filed: May 11, 1988

Related U.S. Application Data

[63] Continuation-in-part of Ser. No. 5,843, Jan. 21, 1987, abandoned, and Ser. No. 13,929, Feb. 12, 1987, abandoned.

[51] Int. Cl.$^4$ .............................. C08J 5/10; C08J 5/06; C08G 63/02
[52] U.S. Cl. .................................... 524/317; 524/366; 523/414; 523/416; 521/48; 521/48.5; 528/272; 528/300; 525/444; 525/441
[58] Field of Search ............... 524/317, 366; 523/414, 523/416; 521/48, 48.5; 528/272, 300; 525/444, 441

[56] References Cited

U.S. PATENT DOCUMENTS

| | | | |
|---|---|---|---|
| 3,652,713 | 3/1972 | Okazaki et al. | 525/444 |
| 4,031,165 | 6/1977 | Saiki et al. | 525/444 |
| 4,337,192 | 6/1982 | Campbell | 525/444 |
| 4,408,022 | 10/1983 | Cincotta et al. | 525/444 |
| 4,451,611 | 5/1984 | Cincotta et al. | 525/444 |
| 4,551,368 | 11/1985 | Smith et al. | 525/444 |
| 4,598,109 | 7/1986 | Sekmakas | 523/414 |
| 4,638,020 | 1/1987 | Christenson | 523/414 |
| 4,661,546 | 4/1967 | Abu-Isa et al. | 525/444 |
| 4,692,484 | 9/1987 | Roberts | 523/414 |

Primary Examiner—John Kight
Assistant Examiner—Dennis R. Daley
Attorney, Agent, or Firm—Dressler, Goldsmith, Shore, Sutker & Milnamow, Ltd.

[57] ABSTRACT

A process of producing a room temperature-stable solvent solution from a high molecular weight crystalline ethylene glycol terephthalate solid polyester is disclosed in which the polyester is incorporated into a hot melt of an hydroxy-functional linear polyester having an hydroxy number of at least about 20, an acid number of less than about 30 and a molecular weight in the range of 1,000 to 10,000. This forms a molten mixture containing from about 20% to about 55% of terephthalate polyester which is maintained as a hot melt until a sample of the melt forms a clear to slightly cloudy solution in a 50% mixture thereof with 2-ethoxy diethanol glycol acetate. The reacted hot melt is then mixed with an organic solvent to form a solution which is useful in thermosetting solvent solution coating compositions.

Aqueous coating compositions may be made using water having dispersed therein a salt of an epoxy phosphate with a volatile base and having stably dispersed therein the aforesaid reacted hot melt after the same is mixed with a water-miscible organic solvent to form a solution which is dispersed in the aqueous medium and cured with a curing agent reactive with hydroxyl functionality.

11 Claims, No Drawings

POLYESTER COATINGS FROM TEREPHTHALATE POLYESTER AND HYDROXY-FUNCTIONAL LINEAR POLYESTER

This application is a continuation-in-part of prior applications Ser. Nos. 005,843 filed Jan. 21, 1987 and 013,929 filed Feb. 12, 1987, both abandoned.

DESCRIPTION

1. Technical Field

This invention relates to the employment of high molecular weight terephthalate polyester plastics in solvent solution to provide solvent solution and aqueous dispersion coating compositions.

2. Background Art

Dimethyl terephthalate polyester plastics are well known and commonly used in molded bottles as a result of their high molecular weight insoluble character which provides a polymer of great strength and physical toughness. These polyesters, as is common knowledge, are made from ethylene glycol. But these insoluble thermoplastic materials are hard to recycle, so they are frequently discarded, creating a formidable disposal problem.

It is desirable to be able to dissolve these terephthalate polyesters in organic solvent to allow their use in solvent solution coating compositions, but this has not been practical. One can heat the terephthalate polyester in a strong solvent and dissolve it, but these high molecular weight polyesters are crystalline, and crystallize out of the solution when it is cooled to room temperature.

High molecular weight crystalline ethylene glycol terephthalate solid polyesters (usually made by reacting dimethyl terephthalate with ethylene glycol) provide an inexpensive source of synthetic resin having great strength and physical toughness. It is desired to convert such polyesters into useful coating compositions, both in solvent solution and in water. These polyesters have previously been digested or transesterified to introduce hydroxy functionality enabling coreaction with organic polyisocyanates, as illustrated in U.S. Pat. No. 4,546,169 and the materials referred to therein, but this does not provide the solubility needed for a stable coating solution. It also does not enable one to place these same resin solutions into aqueous dispersion to enable coating with aqueous systems which include a smaller proportion of organic solvent.

DISCLOSURE OF INVENTION

In accordance with the invention a process is provided for producing a room temperature-stable solvent solution from a high molecular weight crystalline ethylene glycol terephthalate solid polyester comprising, incorporating the polyester into a hot melt of an hydroxy-functional linear polyester having a molecular weight in the range of 1,000 to 10,000 to form a molten mixture containing from about 20% to about 55%, preferably from 25% to 50%, of said terephthalate polyester, maintaining this mixture as a hot melt until a sample of the melt forms a clear to slightly cloudy solution in a 50% mixture thereof with 2-ethoxy diethylene glycol acetate, and then mixing this reacted hot melt with an organic solvent to form a solution of the reacted hot melt in the solvent. This solution is stable, and remains stable when cooled to room temperature, as is essential to have a saleable product.

It appears that the hot melt mixture of terephthalate polyester and linear hydroxy-functional polyester reacts slowly by transesterification so that some of the methyl terephthalate groups transfer onto some of the terminal hydroxyl groups of the lower molecular weight polyester, thus generating hydroxy groups on the terephthalate polyester and compatibilizing the two polyesters. When this reaction has progressed to where the two polyesters are compatible with one another, as indicated by the solution clarity test previously described, then the mixture of polyesters can be dissolved in an organic solvent and the solution cooled to provide a room temperature-stable solution. This mixture of polyesters in stable solution is also useful in aqueous dispersions when the solvent is a water-miscible organic solvent.

The desired transesterification reaction proceeds slowly in the hot melt, but it is convenient to use a temperature in excess of about 200° C., a temperature of 230° C. being typical. While the reaction will proceed without any catalyst, it is convenient to include a catalyst such as dibutyltin oxide to speed the reaction.

It is convenient to add the organic solvent to the reacted hot melt while that melt is still hot, conveniently at about 170° C. After dissolving, the solutions are stable at room temperature.

Preferred organic solvents are ester solvents, especially ether-ester solvents. Thus, one will preferably use 2-ethoxy diethanol glycol acetate or the corresponding propionate or butyrate. However, one can also use the corresponding 2-butoxy ethers as well as other similar ether esters which are illustrated by 2-butoxy ethanol acetate and propylene glycol methyl ether acetate. The du Pont product Dibasic Ester which is a mixture of the dimethyl esters of glutaric acid, azelaic acid and succinic acid is also useful. While these solvents are preferred, the class of inert volatile organic solvents is well known and is broadly useful, especially those which are higher boiling so as to be useful in the dissolving of hot melts. Water-insoluble solvents, such as toluene and xylene, are also contemplated.

These solutions are useful in thermosetting solvent solution coating compositions which comprise the solvent solution product described above having dissolved therein a curing agent adapted to react with hydroxy functionality, usually an aminoplast resin such as hexamethoxy methyl melamine (as in the American Cyanamid product Cymel 303). However, one can also use phenoplast resins, illustrated by phenol-formaldehyde condensate, and blocked polyisocyanates, illustrated by isophorone diisocyanate reacted with two molar proportions of ethyl hexanol to form the diurethane. All of these curing agents are well known for the cure of hydroxy-functional polymers.

Solutions which are particularly useful in thermosetting coatings have a relatively high resin solids content in the range of about 50% to about 65%, but one can use more solvent, if desired. These solutions can be pigmented, if desired, and may contain diverse additives for special purpose, like waxes and flow control agents.

Conventional proportions of curing agent are used, these being from 3% to 45% of curing agent based on total resin solids, preferably from 10% to 30%.

In accordance with a further aspect of this invention, the solution of the compatible mixture of polyesters described above is dispersed in water using an epoxy phosphate dispersed by salt formation in the aqueous medium. Water-miscible organic solvent is present in the aqueous dispersion, but these solvents are preferably minimized in proportion. The solvent solutions which are used to form the aqueous dispersions of this invention have a resin solids content of from about 35% to about 75%, preferably from 50% to 70%.

The hydroxy-functional linear polyesters which are useful herein have an hydroxy value of at least about 20 and an acid number of less than about 30, preferably an acid number of less than about 15 and an hydroxyl number of from 30 to 150, more preferably from 35 to 75. These linear polyesters are themselves well known and are made by simply polyesterifying dihydric alcohols with dibasic carboxylic acids, as will be amply illustrated in the accompanying drawings.

When an organic solvent is employed to aid water dispersibility, it is convenient to add this solvent to the reacted hot melt as previously indicated.

The compatible polyester mixtures and those containing a portion of added solvent are not stably dispersible in water by themselves. However, and in accordance with this invention, it is found that they are stably dispersible in water having dispersed therein an epoxy phosphate.

Any epoxy phosphate which may be dispersed in water with the aid of a volatile base, usually an amine (preferably ammonia) may be used. Water miscible organic solvent may be used to aid dissolution, and this may be the same solvent used to dissolve the polyester mixture or a different one, or one may rely upon the solvent in the polyester mixture solution to avoid adding more organic solvent to assist the dispersion of the epoxy phosphate.

The epoxy phosphates useful herein are preferably resinous polyepoxides which have been reacted with orthophosphoric acid (or an anhydride thereof which provides orthophosphoric acid on addition of water) in an amount of at least 0.05 moles of the acid per equivalent of oxirane in the polyepoxide. The preferred proportion of the orthophosphoric acid is 0.1–0.7 mole per oxirane equivalent, more preferably 0.1–0.5 mole per oxirane equivalent. While phosphoric acid is theoretically trivalent, under the moderate conditions of reaction employed herein (themselves conventional) only one of the three P-OH groups reacts, leaving the other two P-OH groups available for salt formation with volatile amine.

To provide stable dispersions, any unreacted oxirane functionality in the polyepoxide is consumed, preferably by hydrolysis with water. Alternative methods of consuming the unreacted oxirane functionality are by reaction with alcohol or in other ways which are known to the art.

The volatile amines used for neutralization are well known, dimethyl ethanol amine being preferred herein, as illustrated in the examples. Even ammonia is regarded to be a volatile amine since it is known to form water dispersible salts with resinous acidic materials.

The polyepoxides which are used herein may be constituted by any resinous polyepoxide have a 1,2-epoxy equivalency in excess of 1.2, preferably from 1.4 to 2.0. Diglycidyl ethers of a bisphenol, such as bisphenol A, having an average molecular weight in the range of 350–7000 are desirable, an average molecular weight of at least 800 being preferred.. To provide the resistance to boiling water needed for coating sanitary cans, a molecular weight above 1500 is needed. Epon 1001 and Epon 1004 from Shell Chemical Company are preferred, the latter being used for boiling water resistance.

The preferred production of the epoxy phosphate is as described in the commonly owned patent of Kazys Sekmakas and Raj Shah U.S. Pat. No. 4,598,109.

The polyester mixture is dispersed in the aqueous solution of epoxy phosphate using a weight ratio of polyester solids to epoxy phosphate solids of from 1:10 to 2:1, preferably 1:5 to 1:1.

These aqueous dispersions are useful in thermosetting coating compositions which comprise the aqueous dispersions described above having dissolved or dispersed therein a curing agent adapted to react with hydroxy functionality, usually an aminoplast resin such as hexamethoxy methyl melamine (as in the American Cyanamid product Cymel 303). However, one can also use phenoplast resins, illustrated by phenol-formaldehyde condensate, and blocked polyisocyanates, illustrated by isophorone diisocyanate reacted with two molar proportions of ethyl hexanol to form the diurethane. All of these curing agents are well known for the cure of hydroxy-functional polymers.

As will be evident, the polyester mixture is hydroxy functional and the epoxy phosphate is hydroxy functional, so both of these are reactive with the curing agent during the cure. This cure, as is well known, is carried out using elevated temperature, usually a temperature of at least about 300° F.

The aqueous dispersions which are used herein to provide thermosetting coatings may be clear or pigmented, and can be applied by brush, roller or spray, as desired. Diverse additives for special purpose, like waxes and flow control agents, amy also be present.

Conventional proportions of curing agent are used, these being from 3% to 45% of curing agent based on total resin solids, preferably from 10% to 30%. An acid catalyst may be added to speed the cure, as is well known.

This invention is illustrated by the following examples of preferred practice, it being understood that all proportions herein and in the accompanying claims are by weight, unless otherwise specified, and the molecular weights specified are by number average.

EXAMPLE 1

Into a 2000 ml, 4-neck flask is weighed 159.18 grams of diethylene glycol and 45.06 grams of 1,4-butanediol. The flask is equipped with mechanical stirrer, thermometer, nitrogen inlet line and a 3-bubble Snyder column to which is also connected a Dean-Stark trap and a reflux condenser. The flask contents are then warmed to 60° C. at which point 258.42 grams of isophthalic acid, 56.85 grams of adipic acid and 0.75 gram of dibutyltin oxide catalyst are added.

The flask contents are then heated to reflux and water is collected in the Dean-Stark trap. Reflux is continued until an acid value of less than 20 mg KOH per gram is reached. At this point the flask is cooled and the Snyder column is removed.

The flask contents are then reheated to reflux at approximately 220° C. and water is again collected until an acid value of 10 mg KOH per gram is reached to provide a linear hydroxy-functional polyester having an hydroxy number of 40–50.. In all, about 65 grams of water are collected.

When the final acid value is reached, 346.34 grams of pellets of Kodar PETG 6763 (a high molecular weight, crystalline, dimethyl terephthalate solid polyester with ethylene glycol supplied by Eastman Kodak) and 0.03 gram of dibutyltin oxide are added. The mixture is then heated to 230° C. to melt the pellets. The temperature is maintained at 230° C. until a constant reduced viscosity (in a 50% solids solution in 2-ethoxy diethanol glycol acetate) is attained at approximately X-Y in a Gardner bubble standard comparison. The reduced solution clarity at this point should be clear but the sample may subsequently crystallize to a limited extent to produce a slightly hazy solution upon standing overnight.

When these solution characteristics are attained, the molten resin is cooled to 190° C. and 532.50 grams of 2-ethoxy diethanol glycol acetate are slowly added to form a solution. This solution has a resin solids content of 59.0%, an acid value of 15.22 mg KOH per gram of resin, a $Z_4$ Gardner-Holt bubble viscosity and a Gardner color of 6-7 (it was slightly hazy). The solution is cooled and poured out of the flask before it becomes too viscous to allow the solution to be poured out.

EXAMPLE 2

The experiment described in Example 1 is reproduced precisely with the exception of the source of the polyester plastic. In this case, 346.34 grams of plastic pieces cut-up from recycled clear soda bottles were used. This time, the plastic was melted in the hot hydroxy-functional polyester at 245° C. and held for a constant reduced viscosity of X-Y at 50% solids content in 2-ethoxy diethanol glycol acetate. Further dilution with 2-ethoxy diethanol glycol acetate gave a finished product with the following solution properties: 58.15 percent non-volatile resin solids; 15.44 mg KOH per gram resin acid value; $Z_4$-$Z_5$ Gardner bubble viscosity; and 13-14 Gardner color (slightly hazy).

EXAMPLE 3

Into a 3000 ml, 4-neck flask is weighed 327.91 grams of diethylene glycol and 90.12 grams of 1,4-butanediol. The flask is then equipped with mechanical stirrer, thermometer, nitrogen inlet line and 3 bubble Snyder column to which is attached a Dean-Stark type and reflux condenser. The flask contents are heated to 60° C. under a nitrogen atmosphere and 516.84 grams of isophthalic acid, 113.70 grams of adipic acid and 2.0 grams of dibutyltin oxide are added. The material is heated to reflux collecting water in the trap until an acid value of less than 20 mg. KOH per gram is reached.

At this point, the Snyder column is removed and the product is reheated to reflux to collect more water until an acid value less than 6 mg KOH per gram is reached. In all, about 135 grams of water is collected.

At this point, 699.05 grams of Kodar PETG 6763 polyester and 0.05 gram of dibutyltin oxide are added. The mixture is heated to 230° C. and that temperature is maintained until a constant reduced solution viscosity of $Z_2$-$Z_3$ at 50% solids content in dibasic ester solvent (DBE supplied by duPont) is reached. Again, the test sample is clear but some slow crystallization took place overnight to produce a slight haze.

The reaction is terminated by cooling to 190° C., adding 1075 grams of the above-noted dibasic ester solvent, and then further cooling to 60° C. before pouring the product out of the flask. The final solution properties are as follows: 57.06 percent non-volatile resin solids; 12.78 mg KOH per gram-resin acid value; $Z_5$-$Z_6$ Gardner bubble viscosity; and 9-10 Gardner color (slightly hazy).

EXAMPLE 4

Into a 2000 ml, 4-neck flask is weighed 238.75 grams of diethylene glycol, 160 grams of polyoxytetramethylene glycol (Teracol 650 from duPont), 311.25 grams of isophthalic acid, 68.50 grams of adipic acid, and 0.90 grams of dibutyltin oxide. The flask is then fitted with mechanical stirrer, thermometer, nitrogen inlet line, and 3 bubble Snyder column to which is connected a Dean-Stark trap and reflux condenser. The flask contents are heated to reflux at 170° C. under a nitrogen atmosphere and water is continuously collected. Heating is continued until an acid value less than 20 mg KOH per gram is reached. At this point, the column is removed and the molten resin is reheated to reflux to an acid value less than 11. In all, about 85 grams of water are collected. When this phase of reaction is completed, 518.5 grams of Kodar PETG 6763 polyester and 0.03 gram of dibutyltin oxide are added.

The mixture is then heated to 230° C. and held at that temperature until a constant reduced viscosity of Y-Z at 50% in dibasic ester solvent is reached. At this point, the test sample is clear. The reaction is completed by cooling to 190° C. and adding 703 grams of dibasic ester solvent. The solution is poured out of the flask at 60° C. and has the following properties: 63.40 percent non-volatile resin solids; 8.85 mg KOH per gram-resin acid value; $Z_5$-$Z_6$ Gardner bubble viscosity; and 5-6 Gardner color (slightly cloudy).

EXAMPLE 5

Into a 2000 ml, 4-neck flask is weighed 86.63 grams of adipic acid, 296.18 grams of isophthalic acid, 239.00 grams of diethylene glycol, 131.00 grams of polycaprolactone diol PCP-0200 (Union Carbide) and 0.90 gram of dibutyltin oxide. The flask is then equipped with mechanical stirrer, thermometer, nitrogen inlet line, and 3 bubble Snyder column to which is connected a Dean-Stark trap and reflux condenser.

The flask contents are slowly heated to reflux at 190° C. under a nitrogen atmosphere and water is collected in the trap. Heating is continued until an acid value less than 20 mg KOH per gram is reached at which point the column is removed. The molten mass is further heated until an acid value less than 12 mg KOH per gram is reached. In all, about 85 grams of water are collected.

At this point, 501.87 grams of Kodar PETG 6763 polyester and 0.03 gram of dibutyltin oxide are added. The material is heated to 230° C. and maintained until a constant reduced solution viscosity of $Z$-$Z_1$ at 50% solids content in dibasic ester solvent is reached. At this point, the test sample is clear. The reaction is terminated by cooling to 190° C. and adding 780.0 grams of dibasic ester solvent. The finished product has the following solution properties: 59.48 percent non-volatile resin solids; 9.43 mg KOH per gram-resin acid value; $Z_4$-$Z_5$ Gardner bubble viscosity; and 7-8 Gardner color (slightly hazy).

EXAMPLE 6

A white pigmented paste is made in the following manner.

Into a 400 ml stainless steel beaker is weighed 118.3 grams of the solution product of Example 4 and 75.0 grams of rutile titanium dioxide (R-900 supplied by duPont). The mixture is stirred at high speed until smooth and uniform at which point 72.9 grams of SC- 100 solvent (a commercial mixture of aromatic hydrocarbons) is added.

A sample of 133.1 grams of the above paste is then let down into 12.5 grams of hexamethoxymethyl melamine (Cymel 303 supplied by American Cyanamid) in admixture with 1.4 grams of Nacure 1051 (an acid catalyst) to produce a white-pigmented, thermosetting solvent solution coating composition. This coating is drawn down on a steel panel with a #28 wire wound rod and baked for 35 seconds at an oven temperature of 580° F. to cure the coating.

The cured coating produced as above described had the following properties: greater than 100 MEK double rubs, F-H pencil hardness, gloss greater than 80, and flexibility of 1 T bend with no cracking or pick-off.

EXAMPLE 7

An alternate white coating is made from another resin sample. Into a 400 ml stainless steel beaker is weighed 126.09 grams of polyester from Example 5 and 75.0 grams of rutile titanium dioxide (R-900). The mixture is stirred at high speed until smooth and uniform, at which point 65.1 grams of SC-150 solvent is added.

A sample of the above paste (133.1 grams) is then let down into 12.5 grams of Cymel 303 containing 1.4 grams of Nacure 1051.

This white coating is applied to a steel panel using a #28 wire rod and the panel is baked at an oven temperature of 580° F. for 35 seconds.

The cured white coating resists more than 100 MEK double rubs, has a pencil hardness of H, a gloss of 88 and flexibility of Zero T bends with no cracks or pick-off.

As will be evident, the high molecular weight dimethyl terephthalate polyesters which are available in commerce and which are crystalline and solvent insoluble have been incorporated into solution coating compositions which cure to excellent properties.

EXAMPLE 8

Into a 5000 ml, 4-neck flask is weighed 318 grams of diethylene glycol and 90 grams of 1,4-butanediol. The flask is then equipped with mechanical stirrer, thermometer, nitrogen inlet line and 3 bubble Snyder column to which is attached a Dean-Stark trap and reflux condenser. The flask contents are heated to 60° C. under a nitrogen atmosphere and 507 grams of isophthalic acid, 112 grams of adipic acid and 1.5 grams of dibutyltin oxide are added. The material is heated to reflux under a nitrogen atmosphere collecting water in the trap until an acid value of less than 20 mg. KOH per gram is reached.

At this point, the Snyder column is removed and the product is reheated to reflux to collect more water until an acid value less than 10 mg KOH per gram is reached. In all, about 135 grams of water is collected.

At this point, the product is cooled to 180° C. and 685.00 grams of Kodar PETG 6763 polyester and 0.05 gram of dibutyltin oxide are slowly added to enable uniform dissolution. The mixture is then heated to 230° C. and that temperature is maintained until a constant reduced solution viscosity of R-S at 50% solids content in Dowanol BC-300 (from Dow Chemical Co.) is reached. Again, the test sample is clear but some slow crystallization took place overnight to produce a slight haze.

The reaction is terminated by cooling to 190° C., adding 1420 grams of 2-ethoxy diethanol glycol acetate and then cooling to 60° C. before pouring the product out of the flask. The product has a resin solids content of 58.50%, a Gardner-Holt bubble viscosity of $Z_1$-$Z_2$, an acid value of 19.2 mg KOH per gram of resin and a Gardner color of 7-8 (it was slightly hazy).

EXAMPLE 9

An epoxy phosphate was formed using a 5000 ml, 4-neck flask equipped with mechanical stirrer, thermometer, nitrogen inlet line and reflux condenser. Into the flask is weighed 1092 grams of 2-butoxyethanol, 47.3 grams of orthophosphoric acid, and 63 grams of deionized water. The flask contents are then heated to 105° C. under a nitrogen atmosphere.

To the heated solution is then added 2098 grams of a diglycidyl ether of bisphenol A having an average molecular weight of about 2000 (Epon 1004 may be used). Addition is made to occur in small incremental portions with fast agitation over 30 minutes at 105° C. When addition is completed, the temperature of the mixture is maintained at 105° C. for 2 hours. An additional 400 grams of 2-butoxyethanol is then added and the mixture is cooled to 60° C. and poured into a suitable container. The solution contains 61.3% nonvolatile resin solids, it has a Gardner bubble viscosity of $Z_6$-$Z_7$, a Gardner color index of 2-3, and an acid value of 20.1 mg KOH per gram of resin.

EXAMPLE 10

Using the same equipment as in Example 9, there is weighed into the flask 1320 grams of 2-butoxyethanol, 94.4 grams of orthophosphoric acid and 130 grams of deionized water. The flask contents are then heated to 95° C. under a nitrogen atmosphere.

To the heated solution is then added 2100 grams of a diglycidyl ether of bisphenol A having an average molecular weight of about 1000 (Epon 1001F may be used). Addition is made to occur in small incremental portions with fast agitation over 30 minutes at 105° C. When addition is completed, the temperature of the mixture is maintained at 95° C. for 3 hours. An additional 480 grams of 2-butoxyethanol is then added and the mixture is cooled to 60° C. and poured into a suitable container. The solution contains 56.7% nonvolatile resin solids, it has a Gardner bubble viscosity of $Z$-$Z_1$, a Gardner color index of 3-4, and an acid value of 36.4 mg KOH per gram of resin.

EXAMPLE 11

A number of aqueous coating compositions were made using the following general procedure.

The polyester and epoxy phosphate are weighed into a suitably sized stainless steel beaker along with the appropriate crosslinking agent. The mixture is then stirred on a high shear disperser at low speed to ensure a uniform mixture. The desired amount of amine salt-forming agent is then added and stirred in until uniform. The agitation rate is then increased to high speed and water is added slowly and in small increments to prevent precipitation. High speed agitation is continued until an inversion occurs as evidenced by a dramatic reduction in viscosity. Low speed agitation is then used until all of the remaining water is added. At this point, other materials may be added, such as curing catalyst, flow control agent, wax lubricants, etc.

The aqueous coating is then allowed to stand for about 2 to 3 hours to let entrapped air escape. The coating is then applied to heavy gauge untreated aluminum foil using a number 6 wire wound rod. The coated foil is then heated in an oven maintained at 400° F. for 30 seconds, and the cured film is subjected to various tests. It is found that the cured coatings possess excellent resistance to methyl ethyl ketone and are tough and flexible. However, the coatings prepared with the higher molecular weight epoxy resin are significantly superior in possessing better resistance to boiling water.

Resistance to boiling water is determined by deforming the cured foil using a Tinius-Olsen impact tester which places a small bump in the coated foil. The deformed substrate with the cured coating thereon is then placed in boiling water for 30 minutes and then the extent of blushing is observed over the deformed portion of the film. Also, adhesive tape is applied to the deformed portion of the film and the pick-off is observed. The results are as follows.

TABLE

| | | | | |
|---|---|---|---|---|
| Ex. 1 polyester | 7.04 | 7.04 | | |
| Ex. 8 polyester | | | 70.42 | 68.31 |
| Ex. 9 epoxy phosphate | 34.36 | | 343.60 | |
| Ex. 10 epoxy phosphate | | 34.36 | | 361.55 |
| Cymel 303 | 4.19 | 4.19 | 41.94 | 41.94 |
| DMEA | 1.30 | 1.76 | 12.48 | 17.56 |
| Deionized water | 36.45 | 40.26 | 364.50 | 402.64 |
| Wax emulsion | 0.13 | 0.13 | 1.30 | 1.30 |
| Performance | | | | |
| MEK Rubs | 100 | 100 | 100 | 100 |
| Blush | No | Yes | No | Yes |
| Pick-Off | No | Slight | No | Yes |

Corresponding results are obtained using the polyester of Example 2 in place of the polyester of Example 1, the combination with the epoxy phosphate of Example 9 providing no blush and no pick-off, while the combination with the epoxy phosphate of Example 10 showing bad results in each instance.

Thus, while all the combinations provide very useful coatings, those using the higher molecular weight epoxy resin in Example 9 provided uniquely superior resistance to boiling water which fits the coatings for sanitary can use. In the above tabulation, Cymel 303 supplied by American Cyanamid is a hexamethoxymethyl melamine. DMEA identifies dimethyl ethanol amine neutralizing agent, and MEK Rubs is the number of double rubs with a methyl ethyl ketone-saturated cloth needed to remove the coating from the substrate.

What is claimed is:

1. A process of producing a room temperature-stable solvent solution from a high molecular weight crystalline ethylene glycol terephthalate solid polyester comprising incorporating said polyester into a hot melt of an hydroxy-functional linear polyester having an hydroxy number of at least about 20, an acid number of less than about 30 and a molecular weight in the range of 1,000 to 10,000, to form a molten mixture containing from about 20% to about 55% of said terephthalate polyester, maintaining said mixture as a hot melt until a sample of said melt forms a clear to slightly cloudy solution in a 50% mixture thereof with 2-ethoxy diethylene glycol acetate, and then mixing the reacted hot melt with an organic solvent to form a solution of said hot melt in said solvent.

2. A process as recited in claim 1 in which said molten mixture contains from 25% to 50% of said ethylene glycol terephthalate polyester provided by the polyesterification of ethylene glycol with dimethyl terephthalate, and said hydroxy-functional linear polyester has an acid number of less than about 20 and an hydroxyl number of from 30 to 150.

3. A process as recited in claim 2 in which said hydroxy-functional linear polyester has an acid number of less than about 10 and an hydroxyl number of from 35 to 75.

4. The product produced by the process of claim 1.

5. The product of claim 4 in which said organic solvent is 2-ethoxy diethylene glycol acetate.

6. A thermosetting solvent solution coating composition comprising the solvent solution product of claim 4 having dissolved therein a curing agent adapted to react with hydroxy functionality.

7. An aqueous coating composition comprising water having dispersed therein a salt of an epoxy phosphate with a volatile base and having stably dispersed therein a room temperature-stable solvent solution produced by incorporating a high molecular weight crystalline ethylene glycol terephthalate solid polyester into a hot melt of an hydroxy-functional linear polyester having an hydroxy number of at least about 20, an acid number of less than about 30 and a molecular weight in the range of 1,000 to 10,000, to form a molten mixture containing from about 20% to about 55% of said terephthalate polyester, maintaining said mixture as a hot melt until a sample of said melt forms a clear to slightly cloudy solution in a 50% mixture thereof with 2-ethoxy diethylene glycol acetate, and then mixing the reacted hot melt with a water-miscible organic solvent to form a solution of said hot melt in said solvent having a solids content of from about 35% to about 75%.

8. An aqueous coating composition as recited in claim 7 in which the ratio of polyester solids to epoxy phosphate solids is from 1:10 to 2:1.

9. An aqueous coating composition as recited in claim 8 in which said molten mixture contains from 25% to 50% of said ethylene glycol terephthalate polyester, said solution of said hot melt in said solvent has a solids content of from 50% to 70%, and said hydroxy-functional linear polyester has an acid number of less than about 20 and an hydroxyl number of from 30 to 150.

10. An aqueous coating composition as recited in claim 9 in which the ratio of polyester solids to epoxy phosphate solids is from 1:5 to 1:1 and said epoxy phosphate contains from 0.1 to 0.5 mole of orthophosphoric acid per oxirane equivalent, and the balance of the oxirane functionality in said epoxy phosphate is hydrolyzed with water.

11. A thermosetting aqueous coating composition comprising the aqueous coating composition of claim 1 in admixture with a curing agent adapted to react with hydroxy functionality.

* * * * *